United States Patent [19]

Kumagai et al.

[11] Patent Number: 4,584,050
[45] Date of Patent: Apr. 22, 1986

[54] LOOPED-ARTICLE TRANSFER APPARATUS

[75] Inventors: Yuzo Kumagai, Niiza; Yuichiro Ogawa, Fuchu, both of Japan

[73] Assignee: Bridgestone Tire Company Limited, Tokyo, Japan

[21] Appl. No.: 587,024

[22] Filed: Mar. 6, 1984

[30] Foreign Application Priority Data

May 2, 1983 [JP] Japan .................................. 58-78060

[51] Int. Cl.⁴ ........................ B29D 30/08; B66C 23/00
[52] U.S. Cl. .................................. 156/406.2; 156/126; 156/415; 156/416; 156/423; 414/744 A
[58] Field of Search ............... 156/394.1, 405.1, 406.2, 156/415, 416, 423, 126, 127, 123, 133, 111, 414; 211/20, 23, 79, 80; 29/235; 248/274, 278; 414/451, 774 R, 744 A, 680, 910, 908

[56] References Cited

U.S. PATENT DOCUMENTS

| | | | |
|---|---|---|---|
| 4,039,366 | 8/1977 | Yabe .................................. | 156/406.2 |
| 4,105,486 | 8/1978 | Cantarutti .................... | 156/406.2 X |
| 4,402,782 | 9/1983 | Klose et al. .................... | 156/416 X |
| 4,469,546 | 9/1984 | Klose et al. .................... | 156/406.2 |

FOREIGN PATENT DOCUMENTS

| | | | |
|---|---|---|---|
| 49-31549 | 8/1974 | Japan . | |
| 50-15743 | 2/1975 | Japan . | |
| 2092100 | 8/1982 | United Kingdom ............. | 156/406.2 |

Primary Examiner—Edward Kimlin
Assistant Examiner—Thomas Bokan
Attorney, Agent, or Firm—Cushman, Darby & Cushman

[57] ABSTRACT

Apparatus for transferring a looped article to a cylindrical structure, comprising a collapsible ring structure having a center axis aligned with the center axis of the cylindrical structure and a centering plane parallel with the central plane of the cylindrical structure, the ring structure being radially deformable about the center axis thereof, a carrier supporting the ring structure and operative to move the ring structure toward and away from the cylindrical structure, and plural pairs of centering elements provided radially inside the ring structure. Each pair of centering elements are located on both sides of the centering plane of the ring structure and consist of centering elements located on both sides of the centering plane of the ring structure and movable toward and away from the centering plane of the ring structure. Locating means are provided radially outside the ring structure and engage the centering elements for locating each pair of centering elements at selected distances from the centering plane of the ring structure.

11 Claims, 11 Drawing Figures

LOOPED-ARTICLE TRANSFER APPARATUS

FIELD OF THE INVENTION

The present invention relates to an apparatus for transferring a looped article to a drum structure and, more particularly, to a looped-article transfer apparatus for transferring to a tire building drum a looped article such as, typically, a breaker to form part of a pneumatic tire for producing a combination of a breaker and another component element of a tire such as, for example, a tire carcase.

BACKGROUND OF THE INVENTION

There are three widely accepted methods of combining together a breaker and a carcase to form a radial tire for an automotive vehicle. One method is to have looped breakers formed prior to production of tire carcases and to have the breakers applied to tire carcases one after another as or after the carcases are produced. Examples of the apparatus used to put this method into practice are disclosed in Japanese Patent Publication No. 49-31549 and Japanese Provisional Patent Publication No. 50-15743. Another method is to have looped tire carcases formed prior to production of breakers in strip form and to have strips of breakers wrapped on the tire carcases as or after the breakers in strip form are produced. A third method of applying a breaker to a tire carcase is to have breakers and carcases produced preliminarily and to combine them together in consecutive steps.

In each of these prior-art methods of combining breaker and carcase layers of a radial tire, a strip to form the breaker is attached manually to the inner peripheral surface of a cylindrical structure. In this instance, the strip to form the breaker is fitted to the cylindrical structure in such a manner that one longitudinal edge of the strip extends along the circumferential edge of the cylindrical structure. If the strip has irregularities of width throughout its length, the axial center line of the breaker thus attached to the cylindrical structure may partially deviate laterally of the breaker. A tire using such a breaker would fail to provide proper uniformity of performance.

In order to avoid this problem, the cylindrical structure to which a strip to form a breaker is to be fitted may be provided with guide elements adapted to prevent the strip from deviating laterally of the strip, viz., axially of the cylindrical structure. If such guide elements are located at an excessively large axial spacing from each other, the guide elements could not serve as guide means. If the guide elements are located at an excessively short spacing from each other, then one circumferential edge portion of the strip might be caused to ride on the guide element at one axial end of the cylindrical structure, making it impossible to have the strip correctly located on the cylindrical structure. The present invention contemplates elimination of these and other drawbacks which have thus far been encountered in a prior-art looped-article transfer apparatus used to carry out any of the above described methods.

SUMMARY OF THE INVENTION

It is, accordingly, an important object of the present invention to provide an improved looped-article transfer apparatus which is adapted to have a looped article such as a breaker of a pneumatic tire correctly centered on a cylindrical structure even when the breaker may have irregularities of width.

It is another important object of the present invention to provide an improved looped-article transfer apparatus which is adapted to have a looped article such as a breaker of a pneumatic tire manually applied correctly and with utmost ease to a cylindrical structure.

In accordance with the present invention, there is provided a looped-article transfer apparatus for transferring a looped article to a cylindrical structure having a center axis therethrough and an axially central plane perpendicular to the center axis, comprising 1) a generally cylindrical collapsible ring structure having a center axis substantially aligned with the center axis of the cylindrical structure and a centering plane substantially parallel with the central plane of the cylindrical structure, the ring structure being radially deformable about the center axis thereof and being axially movable between a first position remote from the cylindrical structure and a second position coaxially to encircle the cylindrical structure; 2) carrier means supporting the ring structure thereon and operative to move the ring structure between the first and second positions thereof with respect to the cylindrical structure; 3) a plurality of pairs of centering elements provided radially inside the ring structure, each pair of centering elements being located axially on both sides of the centering plane of the ring structure and consisting of centering elements which are located axially on both sides of the centering plane of the ring structure and which are movable toward and away from the centering plane in parallel with the center axis of the ring structure; and 4) locating means provided radially outside the ring structure and engaging the centering elements for locating each pair of centering elements at selected distances from the centering plane of the ring structure.

The looped-article transfer apparatus thus constructed and arranged in accordance with the present invention may further comprise restricting means operative to assure the centering elements to move equal distances toward and away from the centering plane of the ring structure. Furthermore, the ring structure as a whole is, preferably, deformable about the center axis of the ring structure between a generally cylindrical configuration and a generally frusto-conical configuration. In this instance, the ring structure may comprise a plurality of rocking elements disposed on a cylindrical plane about the center axis of the ring structure and each rockable about a pivot axis fixed with respect to the carrier means and substantially tangential to the cylindrical plane, and a plurality of elementary ring segments each having an arcuately curved cross section and disposed on a cylindrical plane about the center axis of the ring structure, each of the ring segments being securely connected adjacent one axial end of the ring structure to each of the rocking elements, respectively and being rockable about the pivot axis of each rocking element. On the other hand, the aforesaid locating means preferably comprises a plurality of pairs of guide rods elongated substantially in parallel with the center axis of the ring structure and fixedly positioned radially outside the ring structure, each pair of guide rods being spaced apart substantially in parallel from each other circumferentially of the ring structure, a pair of slide members slidable on and along each of the guide rods toward and away from the centering plane of the ring structure, a pair of coupling members each connecting together the slide members which are mounted on each pair of guide rods and which are located on each side of the centering plane, the slide members mounted on each pair of guide rods and located on each side of the centering plane of the ring structure being movable with one of each pair of centering elements in parallel with the center axis of the ring structure with respect to the ring structure, and drive means operative to drive the coupling members associated with each pair of guide rods to move toward and away from each other in parallel with the center axis of the ring structure with respect to the ring structure. The above mentioned restricting means may comprise a pinion gear rotatable about an axis fixed with respect to each of the ring segments, and a pair of rack members movable with the coupling members, respectively, of each pair in parallel with the center axis of the ring structure and held in mesh with the pinion gear.

BRIEF DESCRIPTION OF THE DRAWINGS

The features and advantages of a looped-article transfer apparatus according to the present invention will be more clearly appreciated from the following description taken in conjunction with the accompanying drawings in which.

DESCRIPTION OF THE PREFERRED EMBODIMENTS

Figure 1:
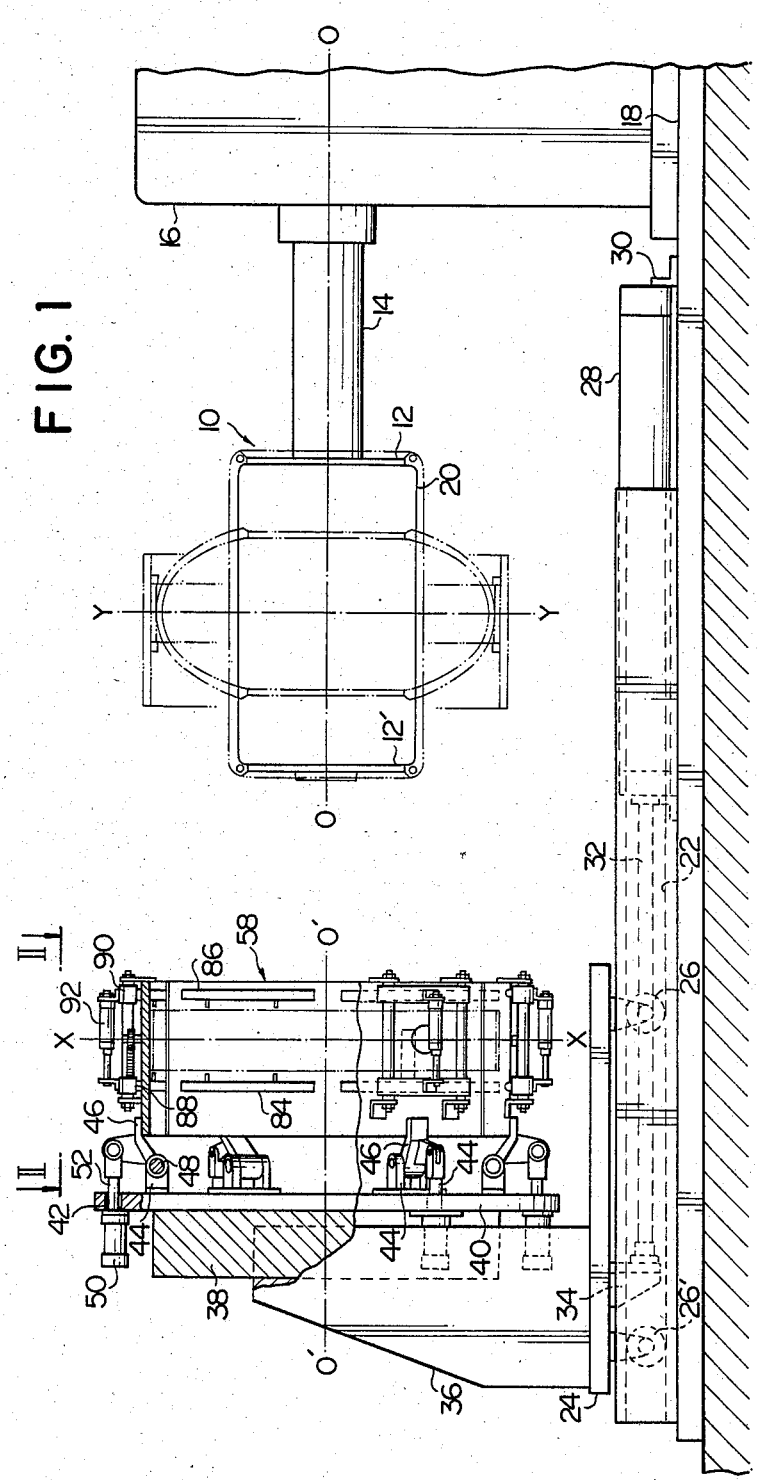
FIG. 1 is a side elevation view showing the overall construction and arrangement of a preferred embodiment of a looped-article transfer apparatus according to the present invention as used in combination with a known tire building unit.

Referring to FIG. 1 of the drawings, a looped-article transfer apparatus embodying the present invention is used in combination with a tire building unit to form a pneumatic tire including a carcase and a breaker. The tire building unit per se is of the construction well known in the art and includes a tire building drum 10 having a horizontal center axis O—O and composed of a pair of axially spaced, annular flange members 12 and 12'. One of the flange members 12 and 12' is supported by a hollow outer shaft 14 rotatable about an axis aligned with the center axis O—O of the drum 10. The outer shaft 14 horizontally projects from a frame structure 16 which is fixedly installed on a horizontal base structure or floor surface 18. The other of the flange members 12 and 12' is supported by an inner shaft (not shown) which extends axially through the outer shaft 14 from the frame structure 14 and which is rotatable with the outer shaft 14 about the axis of rotation of the shaft 14. The tire building drum 10 has an axially central plane Y—Y which is perpendicular to the center axis O—O thereof and which is coincident with the equitorial plane of a tire to be formed on the drum 10. The outer and inner shafts carrying the flange members 12 and 12' are axially movable with respect to each other so that the flange members 12 and 12' are movable toward and away from each other on both sides of the plane Y—Y. The tire building drum 10 as a whole is thus axially deformable between an expanded state with the flange members 12 and 12' spaced apart a maximum distance from each other as indicated by full lines and an axially contracted state with the flange members 12 and 12' spaced apart a minimum distance from each other as indicated by phantom lines. The flange members 12 and 12' of the tire building drum 10 in each of these two states are located at equal distances from the central plane Y—Y of the drum 10. Between the flange members 12 and 12' is provided a bladder 20 which in its entirety is resiliently deformable between a generally cylindrical form as indicated by full lines with the tire building drum 10 held in the axially expanded state and a generally torus form with the drum 10 deformed into the axially contracted state. Means are thus provided to feed air under pressure into the bladder 20 so as to inflate the bladder into the torus form. Though not shown in the drawings, the frame structure 16 has incorporated therein drive means to drive the outer and inner shafts for rotation about their common axis aligned with the center axis O—O of the tire building drum 10 and drive means to drive the two shafts to axially move with respect to each other.

The looped-article transfer apparatus embodying the present invention is provided in combination with the tire building unit thus constructed and comprises a pair of spaced, parallel rails 22 fixedly installed on the base structure or floor surface 18 and are elongated in parallel with the center axis O—O of the tire building drum 10. The rails 22 longitudinally extend away from the frame structure 16 and have portions extending below the tire building drum 10. On these rails 22 is provided a wheeled carrier 24 having front and rear wheels 26 and 26' rollably resting on or engaged by the rails 22. The carrier 24 is thus movable on and along the rails 20 between a first position remote from the tire building drum 10 as shown in FIG. 1 and a second position below the drum 10. The carrier 24 is driven for movement between these two positions by suitable drive means which in the shown embodiment comprises a fluid-operated or pneumatic power cylinder 28 also installed on the base structure or floor surface 18. The power cylinder 28 has a cylinder body fixedly attached to the base structure or floor surface 18 by means of a bracket member 30 and a piston rod 32 axially projecting from the cylinder body and securely connected at its leading end to the carrier 24 by means of a bracket member 34 as indicated by broken lines in FIG. 1. The pneumatic power cylinder 18 has in its cylinder body fluid chambers which communicates with a suitable source of air under pressure through a valved conduit, though not shown in the drawings. Thus, the carrier 24 is adapted to be driven to move from the first position to the second position thereof along the rails 22 when the pneumatic power cylinder 28 is actuated to cause the piston rod 32 to axially retract and backwardly from the second position to the first position thereof when the pneumatic power cylinder 18 is actuated to cause the piston rod 32 to axially extend.

On the carrier 24 is fixedly mounted a support structure 36 including a bracket member 38. The bracket member 38 in turn has fixedly supported thereon a circular disc member 40 having a center axis O'—O' aligned with the center axis O—O of the above described tire building drum 10. The disc member 40 is formed with a suitable number of apertures 42 which are in the embodiment herein shown assumed to be six in number by way of example. The apertures 42 are disposed along the circumference of the disc member 40 and are located at the angular intervals of 60 degrees about the center axis O'—O' of the disc member 40. The disc member 40 has mounted on its front face confronting the drum 10 six pairs of bracket members 44 located adjacent the individual apertures 42, respectively, in the disc member 40. The bracket members 44 of each pair are spaced apart in parallel from each other along the circumference of the disc member 40. A shallowly V-shaped rocking elements 46 is supported on a pivot pin 48 having opposite axial end portions journaled in each pair of bracket members 44. The pivot pin 48 thus mounted on each pair of bracket members 44 extends in parallel with a line tangent to the circumference of the disc member 40. The respective rocking elements 46 supported by the individual pairs of bracket members 44 are thus rockable in radial directions of the disc member 40 about axes respectively parallel with lines tangent to the circumference of the disc member 40 in the vicinity of the apertures 42, respectively. The disc member 40 has further supported thereon six fluid-operated or pneumatic power cylinders 50. Each of the pneumatic power cylinders 50 has a cylinder body securely attached to the rear face of the disc member 40 and a piston rod 52 axially projecting from the cylinder body and extending through each of the apertures 42 in the disc member 40 in parallel with the center axis O'—O' of the disc member 40. The piston rod 52 of each power cylinder 50 projects outwardly from each of the apertures 42 in the disc member 40 and is pivotally connected at its leading end to an arm 54 by means of a pivot pin 56, as will be more clearly seen in FIGS. 2 and 3 of the drawings. The arm 54 is securely connected to or integral with each of the rocking elements 46 so that the individual rocking elements 46 are caused to turn radially of the disc member 40 about the center axes of the pivot pins 48 on which the rocking elements 46 are supported. The individual pneumatic power cylinders 50 jointly communicates with a suitable source of air under pressure through a valved conduit though not shown in the drawings and are to be actuated all at a time during operation of the apparatus. Thus, the rocking elements 46 are concurrently driven to turn radially outwardly of the disc member 40 when the pneumatic power cylinders 50 are actuated to cause their respective piston rods 52 to axially retract and radially inwardly of the disc member 40 when the power cylinders 50 are actuated to cause their respective piston rods 52 to axially extend.

Figure 2:
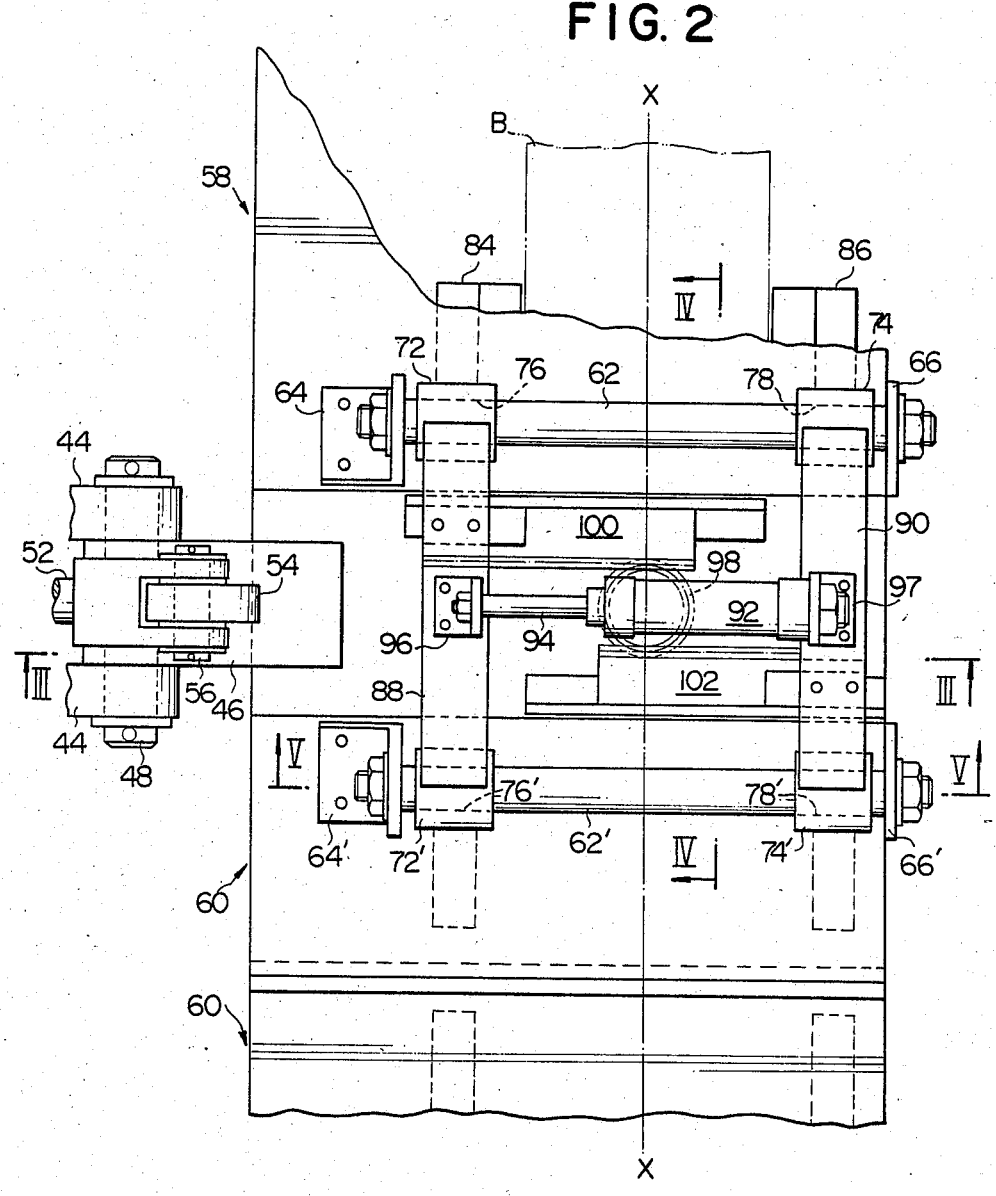
FIG. 2 is a fragmentary top end view of the looped-article transfer apparatus embodying the present invention as viewed from a horizontal plane indicated by line II—II in FIG. 1.
Figure 3:
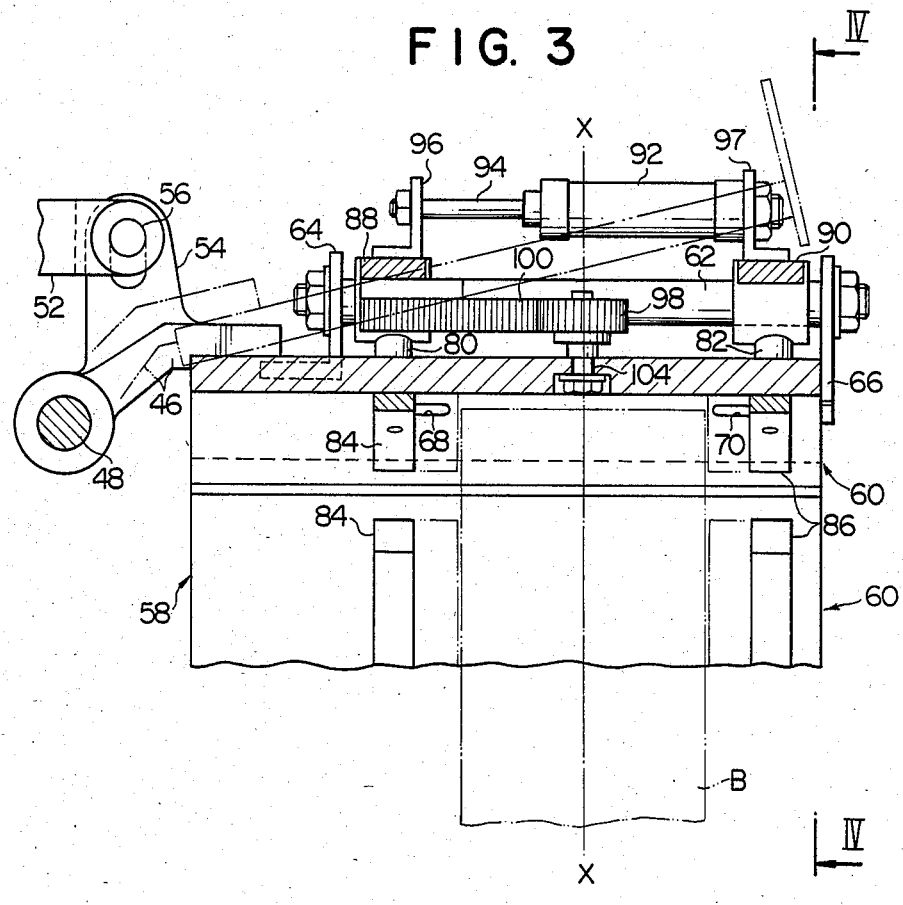
FIG. 3 is an axial sectional view of the looped-article transfer apparatus embodying the present invention taken along line III—III in FIG. 2.
Figure 4:
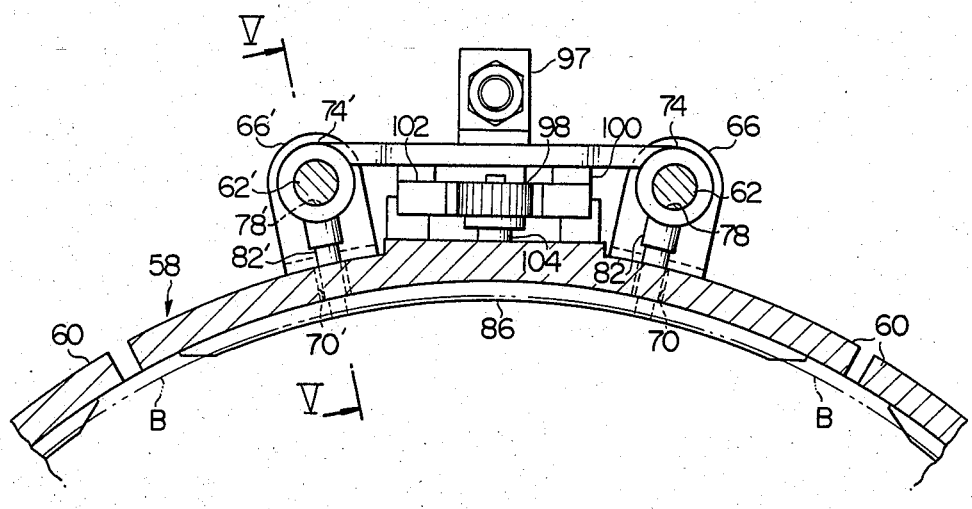
FIG. 4 is a cross sectional view of the looped-article transfer apparatus embodying the present invention as taken along line IV—IV in FIG. 3.
Figure 5:
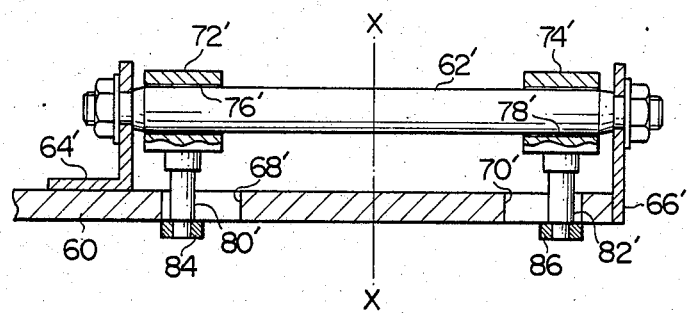
FIG. 5 is an axial sectional view of the looped-article transfer apparatus embodying the present invention as taken along line V—V in each of FIGS. 2 and 4.

Referring not only to FIGS. 1 to 3 but further to FIGS. 4 and 5 of the drawings, the rocking elements 46 arranged as above described are adapted to support a generally cylindrical, radially collapsible or variable-diameter ring structure 58 in such a manner as to permit the structure 58 to radially expand and collapse about an axis aligned with the center axis O—O of the tire building drum 10. Thus, the ring structure 58 as a whole has a center axis aligned with the center axis O—O of the tire building drum 10 and is composed of six generally rectangular elementary ring segments 60 each having an arcuately curved cross section as will be best seen in FIG. 4. The individual ring segments 60 are disposed on a cylindrical plane and constitute in combination the generally cylindrical ring structure 58 and are securely connected at one axial end of the ring structure 58 to the above described rocking elements 46, respectively. The ring segments 60 are thus rockable about the center axes of the pivot pins 48 carrying the rockable elements 46, respectively, between first positions parallel with the center axis of the ring structure 58 as indicated by full lines in FIG. 3 and second positions radially inclined away from the center axis of the structure 58 as indicated by phantom lines in FIG. 3. When the pneumatic power cylinders 50 on the disc member 40 are in conditions having the piston rods 52 axially extended, the ring structure 58 as a whole assumes a radially collapsed state having a generally cylindrical configuration about the center axis O'—O' thereof and a generally cylindrical inner peripheral surface defined by the respective inner faces of the individual ring segments 60. The inside diameter of the ring structure 58 held in this first condition is larger than the outside diameter of the tire building drum 10 and is equal to the outside diameter of the tire breakers to be handled by the looped-article transfer apparatus according to the present invention. When the pneumatic power cylinders 50 are in conditions having the piston rods 52 retracted, the ring structure 58 assumes a radially expanded state having a generally frusto-conical configuration with an enlarged axial end directed away from the disc member 40 or toward the tire building drum 10 when the carrier 24 is held in the first position remote from the tire building unit. When the carrier 24 having the ring structure 58 supported thereon is held in the first position thereof on the rails 22, the ring structure 58 is also maintained in a first position remote from the tire building drum 10 and, when the carrier 24 is held in the second position thereof on the rails 22, the ring structure 58 is maintained in a second position coaxially surrounding the tire building drum 10 as indicated by phantom lines in FIG. 1. The center axis O'—O' of the ring structure 58 and the center axis O—O of the tire building drum 10 are parallel with the rails 22 on the base structure or floor surface 18 so that the center axis O'—O' of the ring structure 58 is at all times aligned with the center axis O—O of the tire building drum 10 when the ring structure 58 is thus moved between the first and second positions thereof with respect to the tire building drum 10. The rails 22 and the carrier 24 constitute carrier means to move the ring structure 58 between the above mentioned first and second positions thereof with respect to the tire building drum 10.

The locating means of the apparatus embodying the present invention comprises a plurality of pairs of guide rods 62 and 62' fixedly positioned radially outside the ring structure 58. In the embodiment herein shown, each pair of guide rods 62 and 62' are securely mounted on the outer face of each of the ring segments 60 forming the ring structure 58 as above described. The guide rods 62 and 62' on each ring segment 60 extend in parallel with the center axis O'—O' of the ring structure 58 and are spaced apart in parallel from each other circumferentially of the ring structure 58 as will be best seen in FIG. 2. The guide rod 62 on each segment 60 is securely connected at the opposite ends thereof to bracket members 64 and 66, respectively, which are attached to each of the ring segments 60 and which are located at or adjacent the axial ends of the segment 60. Likewise, the other guide rod 62' on each ring segment 60 is securely connected at the opposite ends thereof to bracket members 64' and 66', respectively, attached to each of the ring segments 60 and located at or adjacent the axial ends of the segment 60. In FIG. 2, each of the guide rods 62 and 62' is shown having threaded opposite axial end portions fastened to the bracket members by means of nuts engaging the threaded end portions. The center points of the effective lengths of the guide rods 62 and 62' thus mounted on the individual ring segments 60 of the ring structure 58 jointly define a vertical centering plane X—X which is perpendicular to the center axis O'—O' thereof as indicated by a dot-and-dash line in FIGS. 2, 3 and 5. The vertical centering plane X—X of the ring structure 58 is to be coincident with the central plane Y—Y of the tire building drum 10 when the carrier 24 supporting the ring structure 58 is moved to the previously mentioned second position below the tire building drum 10. Each of the ring segments 60 is formed with a pair of elongated slots 68 and 70 (FIG. 3) extending along and in parallel with one guide rod 62 on the segment 60 and a pair of elongated slots 68' and 70' (FIG. 5) extending along and in parallel with the other guide rod 62' on the segment 60. A pair of slide members 72 and 74 are formed with axial bores 76 and 78 as shown in FIGS. 2 and 3 and are axially slidable on one guide rod 62 on each of the ring segments 60. The slide members 72 and 74 are spaced apart equally from the above mentioned vertical centering plane X—X of the ring structure 58 and have stem portions 80 and 82 extending through the slots 68 and 70, respectively, in the ring segment 60. The stem portions 80 and 82 of the slide members 72 and 74 project inwardly from the slots 68 and 70 toward the center axis of the ring structure 58 radially of the structure 58. Similarly, a pair of slide members 72' and 74' are formed with axial bores 76' and 78' as shown in FIG. 5 and are axially slidable on the other guide rod 62' on each of the segments 60. The slide members 72' and 74' are also spaced apart equally from the vertical centering plane X—X of the ring structure 58 and have stem portions 80' and 82' which extend through the slots 68' and 70', respectively, in the ring segment 60. The stem portions 80' and 82' of the slide members 72' and 74' project inwardly from the slots 68' and 70' toward the center axis of the ring structure 58 radially of the structure 58. On the inner face of each of the ring segments 60 is provided a pair of arcuate centering elements 84 and 86 each of which extends arcuately about the center axis of the ring structure 58 with a radius of curvature equal to the radius of curvature of each segment 60. One centering element 84 is securely connected to the stem portion 80 of the slide member 72 and to the stem portion 80' of the slide member 72' and the other centering element 86 is securely connected to the stem portion 82 of the slide member 74 and to the stem portion 82' of the slide member 74'. Each of the arcuate centering elements 84 and 86 on the each of the ring segments 60 is thus slidable on the inner face of the ring segment 60 axially of the ring structure 58.

The respective slide members 72 and 72' on the two guide rods 62 and 62' on each of the ring segments 60 are connected together by suitable drive means adapted to drive the slide members on each of the guide rods on each of the ring segments 60 to move toward and away from the vertical centering plane X—X of the ring structure 58. In the embodiment herein shown, such drive means comprises an elongated coupling member 88 extending perpendicularly to the guide rods 62 and 62' and secured at the opposite ends thereof to the slide members 72 and 72' as shown in FIGS. 2 and 4. The slide members 72 and 72' on the guide rods 62 and 62' are thus connected together by means of the coupling member 88. Likewise, the respective slide members 74 and 74' on the guide rods 62 and 62' on each ring segment 60 are connected together by an elongated coupling member 90 extending perpendicularly to the guide rods 62 and 62' and secured at the opposite ends thereof to the slide members 74 and 74' as shown in FIG. 2. Thus, the slide members 72 and 72' on each ring segment 60 are movable together with each other on the guide rods 62 and 62' and the slide members 74 and 74' on each ring segment 60 are movable together with each other on the guide rods 62 and 62'. The two coupling members 88 and 90 in turn are coupled together by a suitable drive unit adapted to drive the coupling members 88 and 90 to move toward and away from each other axially of the ring structure 58. The drive unit is shown comprising a fluid-operated or pneumatic power cylinder 92 longitudinally extending between the coupling members 88 and 90 on each ring segment 60 in parallel with the guide rods 62 and 62'. The pneumatic power cylinder 92 has a cylinder body securely connected to one of the coupling members such as the coupling member 90 and a piston rod 94 axially projecting from the cylinder body and securely connected at its leading end to a bracket member 96 fixedly attached to the other coupling member 88. The coupling members 88 and 90 are thus driven to move toward each other when the pneumatic power cylinder 92 is actuated to cause the piston rod 94 to axially retract into the cylinder body and, when the pneumatic power cylinder 92 is actuated to cause the piston rod 94 to axially extend from the cylinder body, the coupling members 88 and 90 are driven to move away from each other. As the coupling members 88 and 90 on each segment 60 of the ring structure 58 are moved toward or away from each other, the centering elements 84 and 86 on the inner face of the segment 60 are also caused to move toward or away from each other in parallel with the center axis O'—O' of the ring structure 58. The respective power cylinders 92 on the individual segments 60 of the ring structure 58 are designed to operate in such a manner that the centering elements 84 and 86 on each ring segment 60 are movable between axial positions spaced apart a predetermined maximum distance from each other and positions spaced apart a distance equal to the axial length of the tire breakers to be handled by the looped-article transfer apparatus. When the centering elements 84 and 86 are moved to the latter positions on the ring segments 60, the centering elements 84 and 86 on each of the ring segments 60 are spaced apart equally from the previously mentioned vertical centering plane X—X of the ring structure 58 as indicated by full lines in FIG. 3. The guide rods 62 and 62', slide members 72, 72', 74 and 74' and coupling members 88 and 90 provided radially outside the ring structure 58 and engaging the centering elements 84 and 86 as above described constitute locating means for locating the centering elements 84 and 86 on each of the ring segments 60 at selected distances from the centering plane X—X of the ring structure 58.

In the embodiment herein shown, restricting means are further provided to assure the coupling members 88 and 90 and accordingly the centering elements 84 and 86 to move equal distances toward and away from the centering plane X—X of the ring structure 58 when the pneumatic power cylinder 92 is actuated to drive the coupling members 88 and 90 to move toward and away from the vertical centering plane X—X of the ring structure 58. In FIGS. 2 to 4, such restricting means is shown comprising a pinion gear 98 mounted on each of the ring segments 60 and a pair of elongated rack members 100 and 102 secured to the coupling members 88 and 90, respectively. The pinion gear 98 is free for rotation on a gear shaft 104 projecting from the outer face of each ring segment 60 and axially extending radially of the ring structure 58. The pinion gear 98 is preferably located between the guide rods 62 and 62' on each ring segment 60. On the other hand, the rack members 100 and 102 secured to the coupling members 88 and 90, respectively, extend in parallel with the guide rods 62 and 62' and are commonly in mesh with the pinion gear 98 as will be best seen in FIG. 2. The movement of the coupling members 88 and 90 relative to each other as caused by the pneumatic power cylinder 92 is thus restricted by the engagement between the pinion gear 98 and each of the rack members 100 and 102 so that the coupling members 88 and 90 are assured to move equal distances with respect to the ring structure 58.

Description will be hereinafter made with reference to FIGS. 1 to 5 and further to FIGS. 6A to 6F regarding the mode of operation of the looped-article transfer apparatus thus constructed and arranged in accordance with the present invention.

Figure 6A:
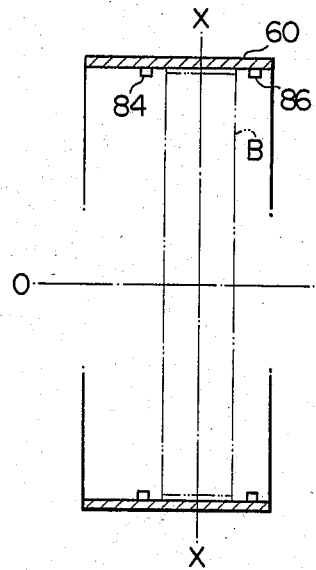
FIGS. 6A to 6F are schematic sectional views showing successive operational conditions of a ring structure forming part of the looped-article transfer apparatus embodying the present invention.

Prior to the start of the looped-article transfer apparatus, a tire carcase C is mounted in cylindrical form on the tire building drum 10 having the flange members 12 and 12' spaced apart a maximum distance from each other as indicated by full lines in FIG. 1. The carrier 24 forming part of the looped-article transfer apparatus is maintained in the previously mentioned first position thereof with the associated pneumatic power cylinder 28 held in a condition having the piston rod 32 extended so that the ring structure 58 is also held in its first position remote from the tire building drum 10. The pneumatic power cylinders 50 on the disc member 40 of the looped-article transfer apparatus are all held in conditions having the piston rods 52 extended so that the individual segments 60 of the ring structure 58 are maintained to extend in parallel with the center axis O'—O' of the ring structure 58. The ring structure 58 as a whole is, accordingly, held in the previously mentioned first condition and assumes a generally cylindrical configuration about the center axis O'—O' thereof. The respective power cylinders 92 on the ring segments 60 are also held in conditions having the piston rods 94 extended so that the coupling members 88 and 90 on each ring segment 60 are spaced apart a maximum distance in a direction parallel with the center axis O'—O' of the ring structure 58. The coupling members 88 and 90 being thus spaced apart from each other, the centering elements 84 and 86 on the inner face of each segment 60 of the ring structure 58 are also spaced apart a maximum distance from each other axially of the ring structure 58 as indicated by full lines in FIG. 3. A looped tire breaker B is fitted manually or in other suitable manner to the inner peripheral surface of the ring structure 58 held in the radially collapsed state and is located axially between the centering elements 84 and 86 as schematically indicated in FIG. 6A of the drawings. In this instance, the breaker B can be manually applied with utmost ease to the inner peripheral surface of the ring structure 58 since the centering elements 84 and 86 on the ring structure 58 being axially spaced apart a maximum distance from each other.

Figure 6B:
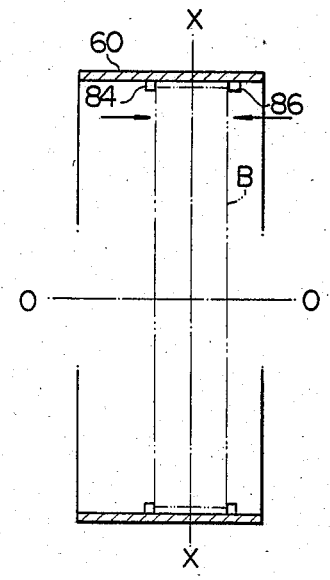

The tire breaker B being fitted to the ring structure 58 as above described, the respective power cylinders 92 on the individual segments 60 of the ring structure 58 are actuated simultaneously to cause the piston rods 94 to retract, driving the coupling members 88 and 90 on the segments 60 to move toward each other. The movement of the coupling members 88 and 90 is accompanied by movement of the rack members 100 and 102 connected to the coupling members 88 and 90, respectively. The pinion gear 98 in mesh with the rack members 100 and 102 on each of the ring segments 60 is therefore caused to turn about the center axis of the gear shaft 104 so that the coupling members 88 and 90 are restricted to moving distances equal to one half of the distance of movement of the piston rod 94 of the pneumatic power cylinder 92. Such movement of the coupling members 88 and 90 is accompanied by movement of the slide members 72 and 74 on the guide rod 62 and the slide members 72' and 74' on the guide rod 62' on each of the segments 60 and further by movement of the centering elements 84 and 86 on the inner face of each ring segment 60. The centering elements 84 and 86 on the individual ring segments 60 are thus caused to move axially of the ring structure 58 toward the vertical centering plane X—X of the ring structure 58 as indicated by arrows in FIG. 6B and at least one of the centering elements 84 and 86 is brought into contact with a circumferential edge of the breaker B. The breaker B is therefore forced to move axially of the ring structure 58 to a correct position having its axially central plane located on the centering plane X—X of the ring structure 58, as shown in FIG. 6B. When the centering elements 84 and 86 on the ring segments 60 reach the positions having the breaker B thus correctly located on the inner peripheral surface of the ring structure 58, the piston rods 94 of the pneumatic power cylinders 92 cease movement so that the breaker B is maintained in the position having its axially central plane located on the vertical centering plane X—X of the ring structure 58.

Figure 6C:
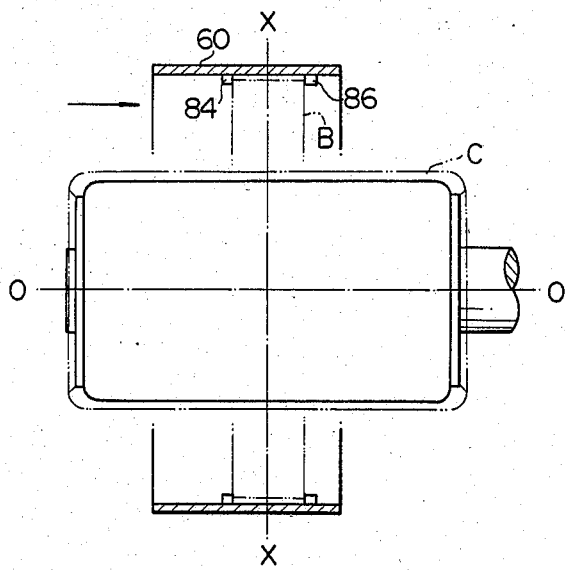
Figure 6D:
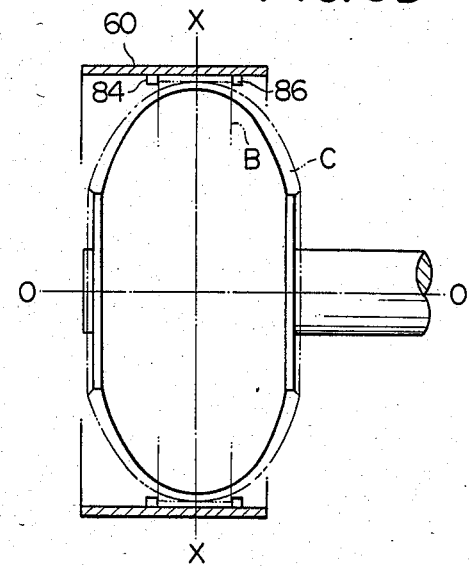
Figure 6E:
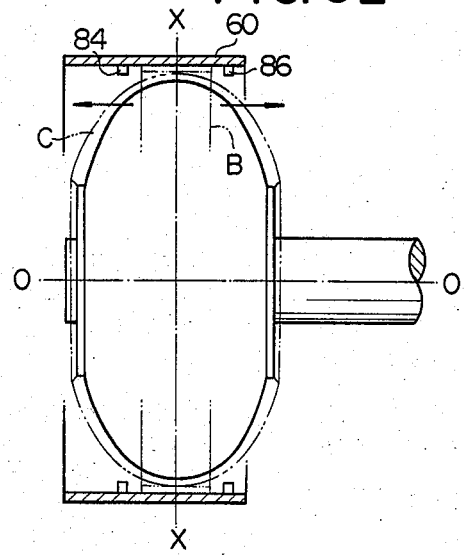

After the breaker B is thus located on the ring structure 58, the pneumatic power cylinder 28 is actuated so that the piston rod 32 thereof is caused to axially retract to drive the carrier 24 from the first position to the second position thereof along the rails 22. It therefore follows that the ring structure 58 supported on the carrier 24 is caused to move from the first position to the second position coaxially encircling the tire building drum 10 with the vertical centering plane X—X of the ring structure 58 located on the central plane Y—Y of the tire building drum 10 as shown in FIG. 6C of the drawings. When the carrier 24 reaches the second position having the ring structure 58 thus positioned with respect to the tire building drum 10, the piston rod 32 of the pneumatic power cylinder 28 ceases movement so that the ring structure 58 is maintained in the position having the centering plane X—X located on the central plane Y—Y of the tire building drum 10. Now that the ring structure 58 is positioned with respect to the tire building drum 10 as described above, the outer and inner shafts respectively connected to the flange members 12 and 12' of the tire building drum 10 are driven to move the flange members 12 and 12' toward each other and concurrently the bladder 20 surrounded by the carcase C on the drum 10 is inflated with air under pressure. The carcase C on the tire building drum 10 is accordingly forced to axially contract and radially expand into torus form on the bladder 20 thus inflated and is brought into pressing contact with the inner peripheral surface of the breaker B on the ring structure 58 along the entire equitorial line of the carcase C, viz., on the vertical centering plane X—X of the ring structure 58 and the central plane Y—Y of the tire building drum 10 as shown in FIG. 6D and indicated by phantom lines in FIG. 1. The breaker B on the ring structure 58 is in this fashion attached to the tire carcase C on the tire building drum 10 along the entire outer circumference of the carcase C.

Figure 6F:
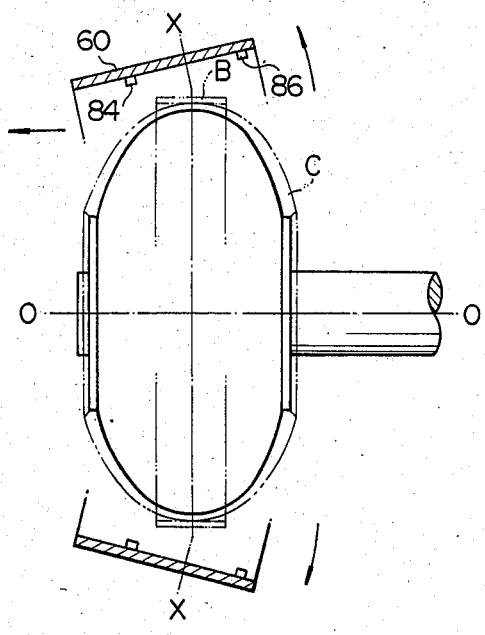

After the breaker B is applied to the tire carcase C as above described, the respective power cylinders 92 on the individual segments 60 of the ring structure 58 are actuated to cause the piston rods 94 to extend. It follows that the coupling members 88 and 80 and accordingly the centering elements 84 and 86 on the ring segments 60 are caused to move away from the vertical centering plane X—X of the ring structure 58 as indicated by arrows in FIG. 6E of the drawings. The breaker B on the ring structure 58 is thus disengaged from the centering elements 84 and 86 with the tire carcase C held in contact with the inner peripheral surface of the breaker B. The pneumatic power cylinders 50 respectively connected to the segments 60 of the ring structure 58 are then actuated to cause the piston rods 52 to retract through the apertures 42 in the disc member 40. The ring segments 60 are thus driven to turn about the center axes of the pivot pins 48 carrying the rockable elements 46, respectively, from the first positions parallel with the center axis of the ring structure 58 to the second positions radially inclined away from the center axis of the structure 58 as indicated by phantom lines in FIG. 3. The ring structure 58 is accordingly expanded in radial directions into the generally frusto-conical configuration around the tire building drum 10 as schematically illustrated in FIG. 6F of the drawings so that the breaker B is disengaged from the ring structure 58 and is completely transferred to the carcase C on the tire building drum 10. Thereupon, the pneumatic power cylinder 28 is actuated to cause the piston rod 32 to extend, thereby driving the carrier 24 to move along the rails 22 from the second position below the tire building drum 10 back to the first position remote from the tire building drum 10. The pneumatic power cylinders 50 on the disc member 40 are then actuated to cause the piston rods 52 to extend for a second time so as to cause the ring structure 58 to radially collapse into the initial generally cylindrical shape about the center axis O'—O' thereof. The carcase C having the breaker B attached thereto is now ready to be removed from the tire building drum 10 for being transferred to a subsequent station.

While it has been assumed that the ring structure 58 which forms part of the looped-article transfer apparatus embodying the present invention is collapsible and expandable between cylindrical and frusto-conical shapes about the center axis O'—O' thereof by means of the rockable members 46, the ring structure of a looped-article transfer apparatus according to the present invention and the means to cause the structure to collapse and expand may be constructed and arranged in such a manner that the ring structure is deformable between cylindrical shapes with two or more different diameters.

As will be understood from the foregoing description, a looped-article transfer apparatus according to the present invention is characterized in the following respects.

(1) The breaker B manually applied to the inner peripheral surface of the ring structure 58 is forced to axially move to a correct position on the ring structure 58 by means of the centering elements 84 and 86 which are brought into contact with the breaker B along one or both of the opposite axial ends of the breaker B. The breaker B can therefore be correctly fitted to the ring structure 58 even when the breaker per se has irregularities of width or may have been incorrectly located on the inner peripheral surface of the ring structure 58.

(2) The centering elements 84 and 86 on the ring structure 58 are axially spaced apart a maximum distance from each other when a breaker B is to be fitted to the ring structure 58. The breaker B can therefore be manually applied with utmost ease to the inner peripheral surface of the ring structure 58.

(3) The locating and restricting means provided on the outer peripheral surface of the ring structure 58 are adapted to have the breaker B located on the ring structure 58 in such a manner that the axial center plane of the breaker coincides with the central plane Y—Y of the tire building drum 10. The breaker B can therefore be located correctly with respect to the carcase C on the tire building drum 10 when the breaker B is to be fitted to the carcase C.

While only one preferred embodiment of a looped-article transfer apparatus according to the present invention has hereinbefore been described and shown, it should be borne in mind that such an embodiment is simply illustrative of the gist of the present invention and is thus subject to changes and modifications if desired.

What is claimed is:

1. A looped-article transfer apparatus for transferring a looped article to a cylindrical structure having a center axis therethrough and an axially central plane perpendicular to the center axis, comprising (1) a generally cylindrical collapsible ring structure having a center axis substantially aligned with the center axis of said cylindrical structure and a centering plane substantially parallel with said central plane of said cylindrical structure, the ring structure being radially deformable about the center axis thereof and being axially movable between a first position remote from said cylindrical structure and a second position coaxially to encircle the cylindrical structure;

(2) carrier means supporting said ring structure thereon and operative to move the ring structure between the first and second positions thereof with respect to said cylindrical structure;

(3) a plurality of pairs of centering elements provided radially inside the ring structure, each pair of centering elements being located axially on both sides of said centering plane of the ring structure and consisting of centering elements which are located axially on both sides of said centering plane of the ring structure and which are movable toward and away from the centering plane in parallel with the center axis of the ring structure; and (4) locating means provided radially outside said ring structure and engaging said centering elements for locating each pair of centering elements at selected distances from said centering plane of the ring structure.

2. A looped-article transfer apparatus as set forth in claim 1, further comprising restricting means operative to assure said centering elements to move equal distances toward and away from said centering plane of the ring structure.

3. A looped-article transfer apparatus as set forth in claim 1, in which said ring structure as a whole is deformable about the center axis of the ring structure between a generally cylindrical configuration and a generally frusto-conical configuration.

4. A looped-article transfer apparatus as set forth in claim 3, in which said ring structure comprises a plurality of rocking elements disposed on a cylindrical plane about the center axis of the ring structure and each rockable about a pivot axis fixed with respect to said carrier means and substantially tangential to said cylindrical plane, and a plurality of elementary ring segments each having an arcuately curved cross section and disposed on a cylindrical plane about the center axis of the ring structure, each of the ring segments being securely connected adjacent one axial end of the ring structure to each of said rocking elements, respectively and being rockable about said pivot axis of each rocking element.

5. A looped-article transfer apparatus as set forth in claim 4, in which each of said ring segments is rockable about the pivot axis of each of said rockable elements between a first position substantially parallel with the center axis of the ring structure and a second position radially inclined away from the center axis of the ring structure.

6. A looped-article transfer apparatus as set forth in claim 1, in which said locating means comprises a plurality of pairs of guide rods elongated substantially in parallel with the center axis of the ring structure and fixedly positioned radially outside the ring structure, each pair of guide rods being spaced apart substantially in parallel from each other circumferentially of the ring structure, a pair of slide members slidable on and along each of said guide rods toward and away from said centering plane of the ring structure, a pair of coupling members each connecting together the slide members which are mounted on each pair of guide rods and which are located on each side of the centering plane, the slide members mounted on each pair of guide rods and located on each side of the centering plane of said ring structure being movable with one of the centering elements of each pair in parallel with the center axis of the ring structure with respect to the ring structure, and drive means operative to drive the coupling members associated with each pair of guide rods to move toward and away from each other in parallel with the center axis of the ring structure with respect to the ring structure.

7. A looped-article transfer apparatus as set forth in claim 6, further comprising restricting means operative to assure said centering elements to move equal distances toward and away from said centering plane of the ring structure.

8. A looped-article transfer apparatus as set forth in claim 7, in which said ring structure comprises a plurality of rocking elements disposed on a cylindrical plane about the center axis of the ring structure and each rockable about a pivot axis fixed with respect to said carrier means and substantially tangential to said cylindrical plane, and a plurality of elementary ring segments each having an arcuately curved cross section and disposed on a cylindrical plane about the center axis of the ring structure, each of the ring segments being securely connected adjacent one axial end of the ring structure to each of said rocking elements, respectively and being rockable about said pivot axis of each rocking element, said guide rods of each pair being securely mounted on the outer face of each of said ring segments.

9. A looped-article transfer apparatus as set forth in claim 7, in which said restricting means comprises a pinion gear rotatable about an axis fixed with respect to each of said ring segments, and a pair of rack members movable with the coupling members, respectively, of each pair in parallel with the center axis of said ring structure and held in mesh with said pinion gear.

10. A looped-article transfer apparatus as set forth in claim 9, in which said drive means comprises a fluid-operated power cylinder longitudinally extending substantially in parallel with the center axis of said ring structure and having a cylinder body fast on one of the coupling members of each pair and a piston rod movable with the other of the coupling members of each pair.

11. A looped-article transfer apparatus as set forth in claim 8, in which each of said ring segments is formed with slots through which said slide members are connected to said centering elements.

* * * * *